United States Patent [19]

Green

[11] 4,004,825
[45] Jan. 25, 1977

[54] SHOPPING CART
[75] Inventor: Alice Green, Downey, Calif.
[73] Assignee: The Raymond Lee Organization, Inc., New York, N.Y.; a part interest
[22] Filed: Sept. 12, 1975
[21] Appl. No.: 612,795
[52] U.S. Cl. .............................. 280/654; 280/655
[51] Int. Cl.² ........................................ B62B 11/00
[58] Field of Search ............ 280/36 C, 41 C, 47.24, 280/47.26, 79.3, 654, 655; 220/19 X

[56] References Cited
UNITED STATES PATENTS

| 2,782,047 | 2/1957 | Moran | 280/36 C |
|---|---|---|---|
| 2,809,047 | 10/1957 | Strohmaier | 280/36 C |
| 2,835,500 | 5/1958 | Berlin | 280/36 C |
| 3,041,026 | 6/1962 | Wilson | 280/36 C |
| 3,920,260 | 11/1975 | Downing | 280/79.3 |

Primary Examiner—Robert R. Song
Attorney, Agent, or Firm—Daniel Jay Tick

[57] ABSTRACT

A basket-type member of a shopping cart is slidably mounted on a frame. Pins are extended through selected holes through the frame and the basket-type member for releasably maintaining the member in a selected position above a surface supporting the cart. Wheels are rotatably mounted at the bottom of the frame and the basket-member is foldable.

3 Claims, 6 Drawing Figures

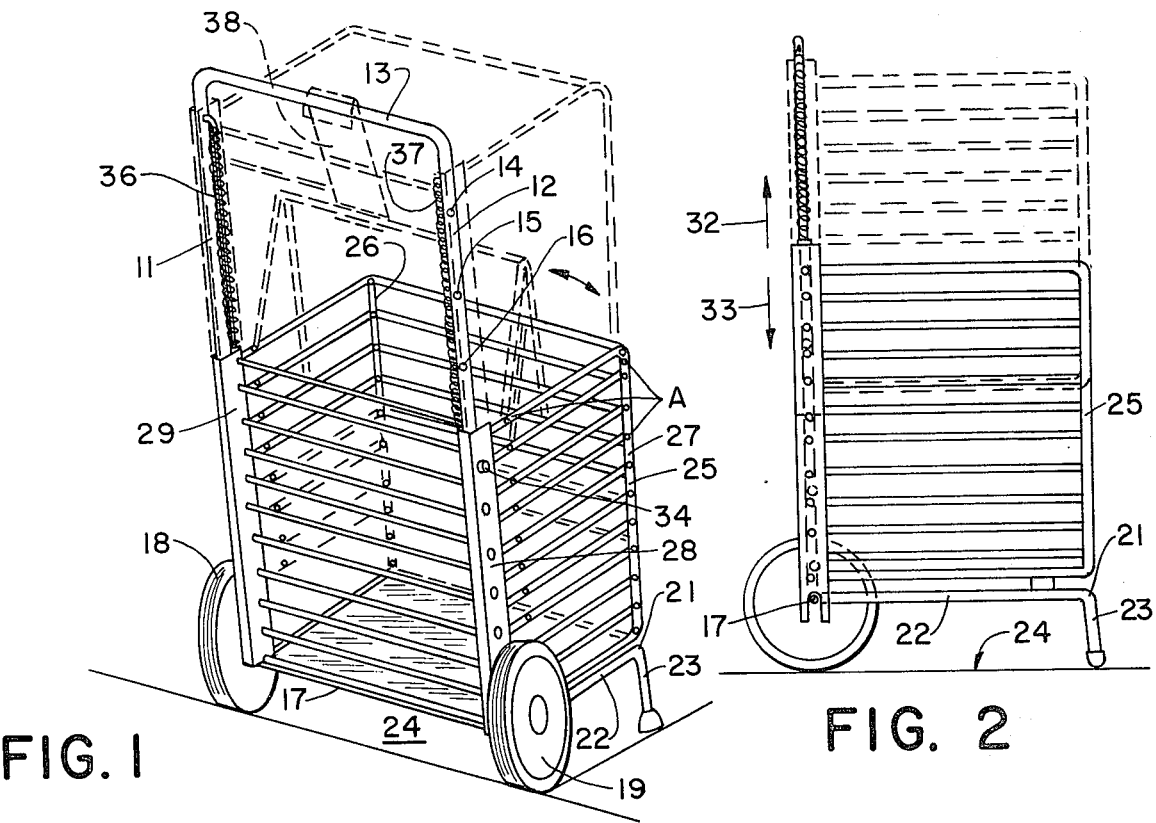
FIG. 1
FIG. 2
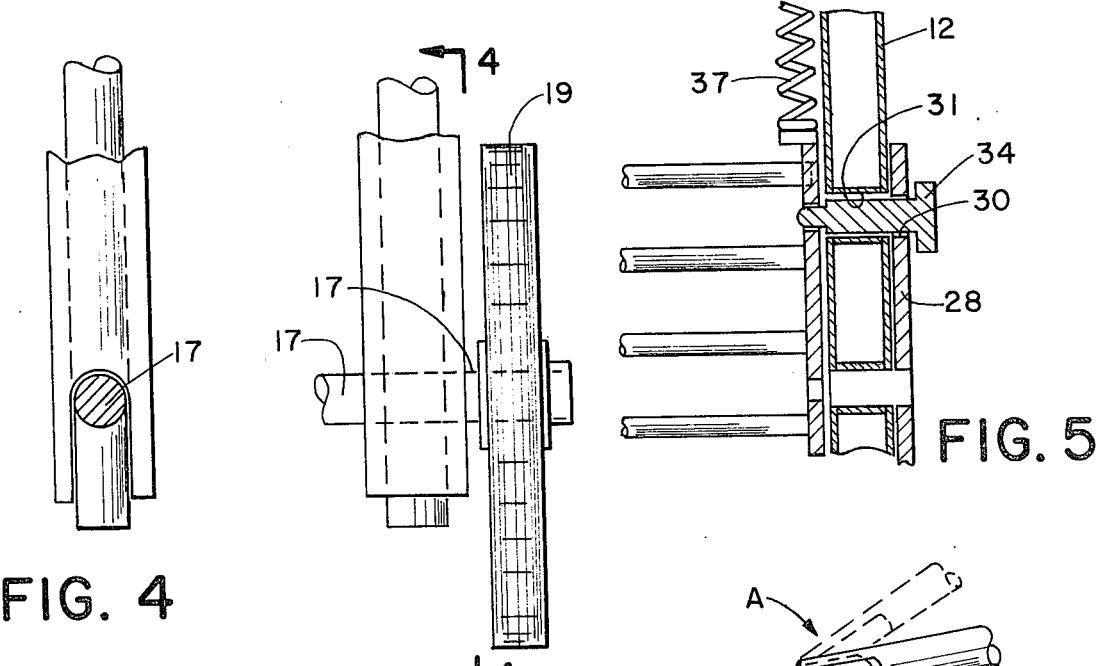
FIG. 4
FIG. 3
FIG. 5
FIG. 6

4,004,825

SHOPPING CART

DESCRIPTION OF THE INVENTION

The present invention relates to a shopping cart.

Objects of the invention are to provide a shopping cart of simple structure, which is inexpensive in manufacture, collapsible with facility and convenience for storage in a small area, and is adjustable with facility, convenience and rapidity, so that its basket is releasably maintained at a selected position above a surface supporting the cart, whereby difficult deep bending required to lead an ordinary shopping cart is eliminated.

In order that the invention may be readily carried into effect, it will now be described with reference to the accompanying drawing, wherein:

FIG. 1 is a perspective view of an embodiment of the shopping cart of the invention;

FIG. 2 is a side view of the embodiment of FIG. 1;

FIG. 3 is a view, on an enlarged scale, of part of the embodiment of FIG. 1;

FIG. 4 is a view, partly in section, taken along the lines 4—4, of FIG. 3;

FIG. 5 is a view, partly in section, on an enlarged scale, illustrating the device for maintaining the basket-type member of the shopping cart at a selected distance above a surface supporting the cart; and FIG. 6 is a perspective view, on an enlarged scale, showing a collapsible joint of the shopping cart of the invention.

The shopping cart of the invention comprises a substantially U-shaped frame having a pair of spaced substantially parallel sides 11 and 12 and a head 13 joining the sides and substantially perpendicular thereto and functioning as the handle of the cart, as shown in FIG. 1. Each of the sides 11 and 12 has a plurality of spaced holes formed therethrough substantially parallel in direction to the head 13. The holes 14, 15 and 16 formed through the side 12 are shown in FIG. 1.

An axle 17 is mounted at the ends of the sides 11 and 12 of the frame opposite the head 13 and substantially parallel to the head.

A pair of wheels 18 and 19 are rotatably mounted on the axle 17 (FIG. 1). Each of the wheels 18 and 19 is mounted on the opposite side of a corresponding side 11 and 12 of the frame from that facing the other side of the frame. Thus, the wheel 18 is mounted on the side of the side 11 opposite that facing the side 12 and the wheel 19 is mounted on the side of the side 12 opposite that facing the side 11.

Each of a pair of support members 20 and 21, of which only the support member 21 is shown in the FIGS. (FIGS. 1 and 2), is of substantially inverted L-shaped. The support member 20 (not shown in the FIGS.) is affixed to the side 11 of the frame in the area of the axle 17. The support member 21 is affixed to the side 12 of the frame in the area of the axle 17. As seen from the illustration of the support member 21, each of the support members 20 and 21 has a first arm 22 extending substantially perpendicularly from a side of the frame and a second arm 23 extending at right angles to the first arm in a manner whereby the support members support the frame in upright position on a supporting surface 24 (FIGS. 1 and 2).

A basket-type member 25 (FIGS. 1 and 2) has four corner members 26, 27, 28 and 29. Each of the corner members 28 and 29 at least partially surrounds the sides 12 and 11, respectively, of the frame and has a hole passing therethrough in alignment with the holes through the side. The hole 30 through the corner member 28 is shown in alignment with a hole 31 through the side 12 in FIG. 5. The basket type member 25 is slidably mounted on the frame by virtue of the two corner members 28 and 29 thereof being slidably mounted on the frame for movement in directions along the sides of the frame. Thus, the corner members 28 and 29, and therefore the basket 25, are slidably movable in the directions of arrows 32 and 33 of FIG. 2.

A pair of pins are provided, of which one pin 34 is shown in FIGS. 1 and 5. The pin 34 is positioned through the hole 30 of the corner member 28 of the basket-type member 25 and through a selected hole such as, for example, the hole 31, through the side 12 of the frame, as shown in FIG. 5, thereby releasably maintaining the basket-type member in a selected position above the surface 24 supporting the cart. The other pin 35 (not shown in the FIGS.) is positioned through the hole of the corner member 29 of the basket-type member and through a selected hole through the side 11 of the frame, thereby serving the same function as the pin 34.

The basket-type member 25, as shown by the broken lines in FIGS. 1 and 2, is foldable in the areas of the corner members 28 and 29.

A pair of compression springs 36 and 37 (FIG. 1) are provided. The spring 36 is mounted next-adjacent the side 11 of the frame and the spring 37 is mounted next-adjacent the side 12 of the frame. The springs 36 and 37 urge the basket-type member 25 toward the support members 20 and 21.

A latch member 38 (FIG. 1) is used to releasably latch the basket-type member 25 to the head 13 of the frame when said basket-type member is in folded condition, as shown by broken lines in FIG. 1.

The basket-type member 25 is maintained in its unfolded or use condition by its weight. In other words, the natural condition of the basket-type member is its unfolded condition, as shown in FIGS. 1 and 2.

While the invention has been described by means of a specific example and in a specific embodiment, I do not wish to be limited thereto, for obvious modifications will occur to those skilled in the art without departing from the spirit and scope of the invention.

I claim:

1. A shopping cart, comprising
   a substantially U-shaped frame having a pair of spaced substantially parallel sides and a head joining the sides and substantially perpendicular thereto and functioning as the handle of the cart, each of the sides having a plurality of spaced holes formed therethrough substantially parallel in direction to the head;
   an axle mounted at the ends of the sides of the frame opposite the head substantially parallel to the head;
   a pair of wheels rotatably mounted on the axle, each on the opposite side of a corresponding side of the frame from that facing the other side of said frame;
   a pair of support members each of substantially inverted L-shape and each affixed to a corresponding one of the sides of the frame in the area of the axle, each of said support members having a first arm extending substantially perpendicularly from a side of the frame and a second arm extending at right angles to the first arm in a manner whereby the support members support the frame in upright position on a supporting surface;

a basket-type member having four corner members, each of two of which at least partially surrounds a corresponding side of the frame and has a hole passing therethrough in alignment with the holes through the side, said basket-type member being slidably mounted on the frame by virtue of the two corner members thereof being slidably mounted on the frame for movement in directions along the sides of the frame; and a pair of pins each positioned through the hole of a corresponding corner member of the basket-type member and through a selected hole through the corresponding side of the frame thereby releasably maintaining the basket-type member in a selected position above a surface supporting the cart.

2. A shopping cart as claimed in claim 1, wherein said basket-type member is foldable in the areas of said two corner members.

3. A shopping cart as claimed in claim 1, further comprising spring means mounted at each side of the frame for urging the basket-type member toward the support members.

* * * * *